(12) United States Patent
Jalkanen (10) Patent No.: US 9,301,079 B2
(45) Date of Patent: Mar. 29, 2016

(54) ROAMING IN COMMUNICATIONS SYSTEM

(75) Inventor: Tero Jalkanen, Tuusula (FI)

(73) Assignee: TELIASONERA AB, Stockholm (SE)

( * ) Notice: Subject to any disclaimer, the term of this patent is extended or adjusted under 35 U.S.C. 154(b) by 134 days.

(21) Appl. No.: 13/276,626

(22) Filed: Oct. 19, 2011

(65) Prior Publication Data
US 2012/0099573 A1 Apr. 26, 2012

(30) Foreign Application Priority Data

Oct. 22, 2010 (EP) ..................................... 10188563

(51) Int. Cl.
| | | |
|---|---|---|
| H04W 4/00 | (2009.01) | |
| H04L 12/28 | (2006.01) | |
| H04W 8/02 | (2009.01) | |
| H04W 24/00 | (2009.01) | |
| H04W 76/02 | (2009.01) | |

(52) U.S. Cl.
CPC ................ *H04W 4/001* (2013.01); *H04W 8/02* (2013.01); *H04W 24/00* (2013.01); *H04W 76/02* (2013.01)

(58) Field of Classification Search
CPC ..... H04W 36/14; H04W 36/16; H04W 36/24; H04W 84/045; H04W 88/06
USPC .......................... 370/338, 401; 455/432.1, 433
See application file for complete search history.

(56) References Cited

U.S. PATENT DOCUMENTS

| | | | | |
|---|---|---|---|---|
| 7,702,329 | B1 * | 4/2010 | Durig et al. ................ | 455/432.1 |
| 2007/0117564 | A1 * | 5/2007 | Reynolds ..................... | 455/436 |
| 2009/0270099 | A1 * | 10/2009 | Gallagher et al. ......... | 455/435.1 |
| 2011/0176485 | A1 * | 7/2011 | Pudney et al. ................ | 370/328 |
| 2011/0286384 | A1 * | 11/2011 | Sugimoto et al. ............. | 370/328 |
| 2012/0100848 | A1 * | 4/2012 | Miklos ........................ | 455/432.1 |
| 2012/0309447 | A1 * | 12/2012 | Mustajarvi et al. ........... | 455/524 |
| 2013/0115956 | A1 * | 5/2013 | Ewert et al. .................... | 455/437 |

FOREIGN PATENT DOCUMENTS

| | | |
|---|---|---|
| WO | WO 2007/104324 A1 | 9/2007 |
| WO | WO 2008/060208 A1 | 5/2008 |

OTHER PUBLICATIONS

Marvell, "On the scenario of both home-routed and local breakout IMS sessions", vol. SA WG2, no. Marina del Rey, California, USA, Jan. 14-18, 2008, pp. 1-2.
Extended European Search Report from European Application No. 101885630.0, dated Mar. 10, 2011.

\* cited by examiner

*Primary Examiner* — Dang Ton
*Assistant Examiner* — Ryan Kavleski
(74) *Attorney, Agent, or Firm* — Cozen O'Connor (57) ABSTRACT

The present solution relates to providing a call service in a communication system, where in response to recognizing a predetermined event related to a user terminal (UEA), it is checked (203, 204) whether the user terminal (UEA) is a roaming user terminal (UEA) roaming in a visited packet switched network. It is also checked (203, 204) whether the user terminal (UEA) is defined to use a home network routing function in the visited packet switched network. If the user terminal (UEA) is a roaming user terminal (UEA) roaming in the visited packet switched network and defined to use the home network routing function in the visited packet switched network, the home network routing function is over overridden by performing (209) a forced setup of the call service to a local circuit switched network.

24 Claims, 6 Drawing Sheets

ROAMING IN COMMUNICATIONS SYSTEM

CROSS-REFERENCE TO RELATED APPLICATION

This application claims priority under 35 USC §119 to European Application No. 10188563.0 filed on Oct. 22, 2010 which is incorporated by reference in its entirety.

FIELD OF THE INVENTION

The exemplary and non-limiting embodiments of this invention relate generally to a communications system and more particularly to providing a call service to a roaming user terminal.

BACKGROUND

In an LTE network, packet switched roaming is arranged to work such that both signalling and media traffic are routed back to the home network regardless of the destination of the call. Thus a voice call over the LTE packet switched network domain using the home routing model does not work properly, due to the too much increase of delay between the foreign roaming network and the home network.

One solution is to continue using the 2/3G network instead of LTE whenever a user terminal is roaming. A disadvantage with that is that advanced LTE services (other than voice) would then not work during roaming. Another solution may be to use manual network selection from LTE to 2/3G prior to making a voice call. A disadvantage associated with that is that the user of the user terminal is not necessarily aware of the available 2/3G networks, if any, to make the selection.

BRIEF DESCRIPTION OF THE INVENTION

An object of the present solution is to provide a method, system, network apparatus and a user terminal for implementing the method so as to alleviate the above disadvantages. The objects of the invention are achieved by a method and an arrangement which are characterized by what is stated in the independent claims. Further embodiments are disclosed in the dependent claims.

The present solution is based on the idea of providing a call service in a communication system, wherein, in response to recognizing a predetermined event related to a user terminal, it is checked whether the user terminal is a roaming user terminal roaming in a visited packet switched network. It is also checked whether the user terminal is defined to use a home network routing function in the visited packet switched network. If the user terminal is a roaming user terminal roaming in the visited packet switched network and defined to use the home network routing function in the visited packet switched network, the home network routing function is over overridden by performing a forced setup of the call service to a local circuit switched network.

An advantage of the present solution is that a dynamic local breakout function may be provided to a roaming user terminal in an advanced communications system. Another advantage of the present solution is that a dynamic circuit switched fallback function may be provided to a roaming user terminal in an advanced communications system.

BRIEF DESCRIPTION OF THE DRAWINGS

In the following the invention will be described in greater detail by means of exemplary embodiments with reference to the attached drawings, in which.

DETAILED DESCRIPTION OF PREFERRED EMBODIMENTS

Exemplary embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Like reference numerals refer to like elements throughout.

The present invention is applicable to any user terminal, network node, server, corresponding component, and/or to any communication system or any combination of different communication systems that support a roaming functionality. The communication system may be a fixed communication system or a wireless communication system or a communication system utilizing both fixed networks and wireless networks. For example, the present solution may be utilized in a UMTS, GSM, EDGE, WCDMA, LTE network, Bluetooth network, a wireless LAN network, or other mobile network. The protocols used, the specifications of communication systems, servers and user terminals, especially in wireless communication, develop rapidly. Such development may require extra changes to an embodiment. Therefore, all words and expressions should be interpreted broadly and they are intended to illustrate, not to restrict, the embodiment.

The present solution is related to handling of voice calls (and/or SMS, facsimile service) in the next generation mobile network (LTE/4G) in a roaming scenario, and to the general LTE roaming work going on in a GSMA RiLTE group.

A challenge in a long term evolution (LTE) network is that a traditional circuit switched (CS) network domain is missing, i.e. traditional call services, such as voice calls, facsimile service and short message service (SMS), are supposed to use a packet switched (PS) network domain. The packet switched (PS) network domain has not been used earlier for the basic services; therefore having the voice service only in the PS network domain creates interesting scenarios especially in a multi-operator environment such as roaming.

In earlier systems (e.g. GSM), the voice calls use circuit switched (CS) roaming which allows customer voice traffic (=media) to use a local breakout function, e.g. a Finnish customer in Australia calling to a local (Australian) number does not have his/her voice traffic routed all the way back home to the Finnish core network and then back again to Australia. Instead, in the circuit switched (CS) roaming, while signalling goes back home, the media stays at the visited public land mobile network (VPLMN). In an LTE network, the PS roaming works differently compared to the CS roaming: both signalling and media traffic are routed back to the home network (home routing function) every time, regardless of the destination. This is fine for most of the services, such as WAP browsing, email or MMS. However, e.g. in the above Australian/Finnish case, a voice call over the PS network domain using that kind of home routing model simply does not work properly, due to the too much increase of delay between Finland and Australia.

Voice calls in the LTE systems use internet protocol (IP). An IMS-based VoLTE (voice over LTE) solution is defined as a common mechanism for the voice calls in LTE. A fallback solution from the IP-based LTE to the CS-based 2G/3G network for voice calls and/or SMS is defined in 3GPP specifications, however, it is only used when an optimal solution of the IMS-based VoLTE is not available.

An embodiment of the present solution defines an advanced masking method which may be used by VPLMN to override user terminal and/or HPLMN decisions. The embodiment enables utilizing a local breakout on PS domain based VPLMN decision even if this was not really asked for. A "dynamic CS fallback in LTE roaming" embodiment illustrates how to solve the same problem by using the CS network domain dynamically. Thus the present solution allows an automatic dynamic solution for handling a voice service when roaming, selecting between the optimal PS model/solution depending on the generic roaming architecture used in that particular VPLMN when using LTE.

In the following, different embodiments will be described using, as an example of a system architecture whereto the embodiments may be applied, an architecture based on an advanced communications (such as LTE) network, without restricting the embodiment to such an architecture, however.

Figure 1:
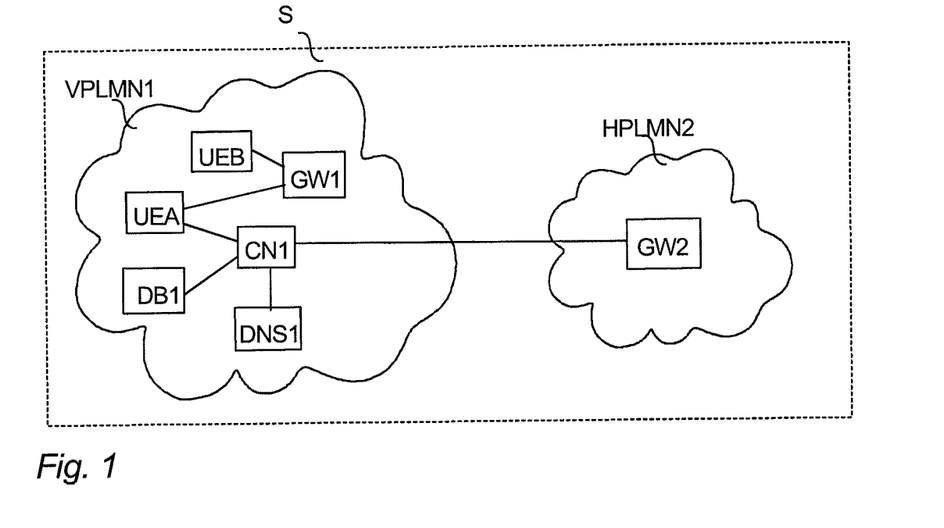
FIG. 1 illustrates a communications system according to an exemplary embodiment.

A general architecture of a communication system S providing a dynamic local breakout functionality to a user terminal in a roaming network is illustrated in FIG. 1. FIG. 1 is a simplified system architecture only showing some elements and functional entities, all being logical units whose implementation may differ from what is shown. The connections shown in FIG. 1 are logical connections; the actual physical connections may be different. It is apparent to a person skilled in the art that the systems also comprise other functions and structures. It should be appreciated that the functions, structures, elements and the protocols used in or for local breakout, are irrelevant to the actual invention. Therefore, they need not to be discussed in more detail here.

Referring to FIG. 1, a communications system S according to an exemplary embodiment of the present solution comprises a visited public land mobile network VPLMN1, such as an LTE network. The communications system S further includes a home public land mobile network HPLMN2, such as an LTE network. The visited public land mobile network VPLMN1 includes a core network node CN1, such as a mobility management entity (MME), a serving gateway (SGW) or any other suitable core network element. The core network node CN1, located in VPLMN1, is operatively connected to a domain name server DNS1, located in VPLMN1. Further, the core network node CN1 may be operatively connected to a database DB1, located e.g. in VPLMN1. Yet further, the core network node CN1 may be operatively connected to a gateway node GW2, such as a packet data network (PDN) gateway, located in HPLMN2. The system S further comprises a user equipment UEA, UEB that may be e.g. a mobile or wireless user terminal, such as a mobile phone (mobile station), a personal digital assistant (PDA), a game console, a smart phone, a personal computer (PC), a laptop, a desktop computer or the like, capable of communicating in a roaming situation. The first user terminal UEA is able to connect to the second user terminal UEB via a gateway node GW1, such as a packet data network (PDN) gateway, located in VPLMN1. The first user terminal UEA is able to connect to a gateway node GW2, such as a packet data network (PDN) gateway, located in HPLMN2, via the core network node CN1. In the example shown in FIG. 1, the first user terminal UEA is roaming in the visited public land mobile network VPLMN1, and the home public land mobile network HPLMN2 is the home network of the first user terminal UEA.

FIG. 1 shows a simplified version of an LTE network structure, which only illustrates the components that are essential to illustrate the present solution, even though those skilled in the art naturally know that a general communications system also comprises other functions and structures, which do not have to be described in more detail herein. The network element CN1, GW1, DNS1, DB1, GW2 may include any network element operated by a network operator in a cellular, wireless and/or fixed network, such as a mobile switching centre, SGSN, GGSN, VLR, HLR, HSS, base station, access point, radio network controller, database, and/or a network computer or server. Although each network element UEA, UEB, CN1, GW1, DNS1, DB1, GW2 has been depicted as one entity, different modules and memory may be implemented in one or more physical or logical entities. A general architecture of a communication system providing session-based communication is illustrated in FIG. 1. It is apparent to a person skilled in the art that the systems also comprise other functions and structures. It should be appreciated that the functions, structures, elements and the protocols used in or for session-based communication are irrelevant to the actual invention. Therefore, they need not be discussed in more detail here.

Figure 2:
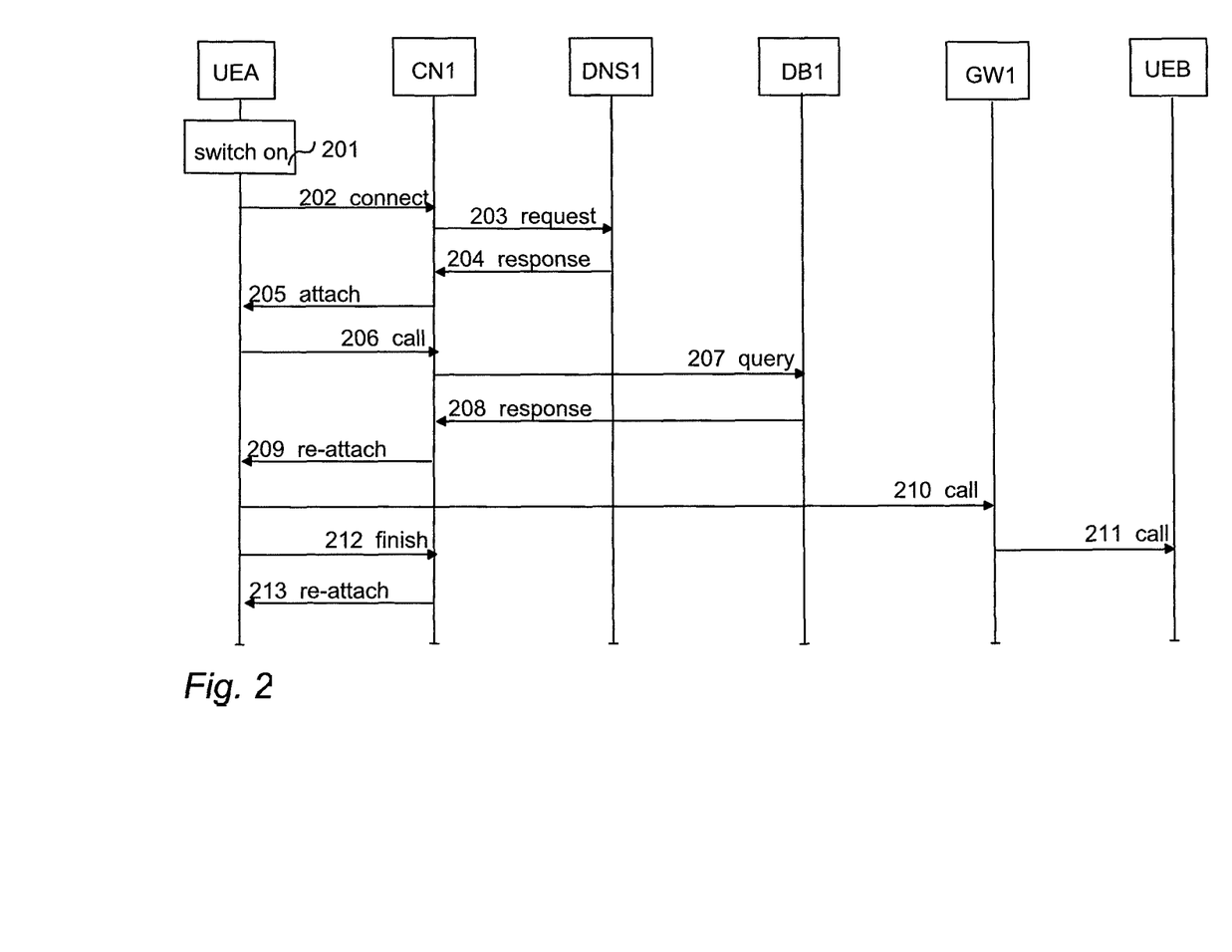
FIG. 2 illustrates signalling according to an exemplary embodiment.

FIG. 2 illustrates signalling according to an exemplary embodiment of the present solution. Referring to FIG. 2, Pekka is in Australia, and he switches on 201 his fancy LTE terminal. In response to being switched on, the terminal starts connecting 202 to the LTE network e.g. by using normal standardized SGW/PGW discovery mechanisms (a respective message 202 is transmitted from UEA to CN1). A VPLMN DNS system finds out 203, 204 information on the correct corresponding SGW/PGW nodes based on Pekka's terminal request 202 which includes FQDN of Pekka's HPLMN (CN1 requests 203 the SGW/PGW information from DNS1 based on FQD; DNS1 transmits a response 204 to CN1 (thus CN1 is able to check whether UEA is roaming and whether home routing function is in use for UEA)). Based on an agreement between HPLMN2 and VPLMN2, the corresponding PGW node is either located in the home network of UEA (=home routing used) or in the visited network (=local breakout used). VPLMN1 responds 205 with the assumed IP address of PGW, in this scenario pointing towards the HPLMN PGW (i.e. GW2). In the exemplary embodiment, based on the network implementation and/or end-user preference, VPLMN1 can be automatically configured to perform an override of the home routing function by performing a local PS breakout (i.e. routing the call from UEA to GW1), even though the agreement with HPLMN2 originally states the use of HPLMN PGW (i.e. GW2). In practise, this may be handled as follows:

a) In the initial LTE network attach message 205, VPLMN1 (i.e. CN1) is configured to respond 205 with the VPLMN PGW IP address (i.e. the address of GW1) instead of HPLMN PGW IP address (i.e. the address of GW2). This is a simple mechanism, but it means that all the traffic, also including non-voice, is then routed by using local breakout.

b) The LTE terminal is initially attached 205 "in an official way" to HPLMN PGW IP address (i.e. HPLMN PGW IP address (i.e. the address of GW2) is given 205 by CN1 to UEA), but when a voice call is 206 initialized by UEA, VPLMN1 (i.e. CN1) is configured to order 209 the terminal to perform a re-attach. When this is carried out, VPLMN PGW IP address (i.e. the address of GW1) is given 209 to the terminal instead. When the call 210, 211 (from UEA via GW1 to UEB) is over (e.g. a call finishing message 212 received in CN1 from UEA), VPLMN1 orders 213 the terminal to perform another reattach, and this time HPLMN PGW IP address (i.e. the address of GW2) is given 213 to UEA. Thus the system can be configured to use local breakout for voice calls (and SMS) only (thus allowing home routing to be used for the more advanced services such as email, MMS, WAP browsing). The re-attach procedure may require some extra time compared to point "a)".

As an advanced option (meaning better end-result but possibly a longer call setup time), the VPLMN "dynamic local breakout function" may also be configured to perform a query 207 (i.e. CN1 transmits a query message 207 to DB1, and a response 208 is transmitted from DB1 to CN1) on the MSISDN/address of the called party UEB to see if the particular voice call (or SMS) is addressed to:

1) a user of VPLMN1 or any other local operator (=>local breakout);

2) a user of HPLMN2 (=>no local breakout);

3) a user of some other operator (=>no clear answer). This point "3)" may depend on available agreements and/or commercial benefits, etc. It is possible to have this particular logic input as an implementation/configuration issue that may be modified by the user, HPLMN2 or even VPLMN1, based on their preferences. For example, HPLMN2 may be configured to put in a restriction along the lines e.g. of "for distances longer than 3000 km, it is possible to use local breakout". Or VPLMN1 may be configured to have its own preference here. It should be noted that having the actual location of the receiver is probably not going to work, due to the possibility that s/he is roaming somewhere, but likely in most of the cases it is enough to know whether the call is being routed e.g. to a number belonging to a New Zealand operator (local breakout needed) or a Swedish operator (home routing works fine) in this Australian example. Performing this additional advanced logic may add some delay caused by the query functionality.

Assuming Pekka wants to check the status of tickets for the Sydney opera house, he dials the local number in his fancy LTE terminal to initialize a voice call 206. Based on the PGW discovery handled earlier (messages 203, 204), and possibly based on the use of receiving MSISDN/address (messages 207, 208) too, VPLMN1 knows that it should perform a local breakout override, since in this network home routing is used for PS domain (i.e. CN1 forces UEA to set up the call service via the local network such that the home network routing function is overridden). A local breakout is carried out, and the call to the opera house allows Pekka to have a good quality discussion on the discount tickets via GW1.

One option is that via some mechanism (such as push SMS) VPLMN1 asks the user e.g. "in case you would like to set up an optimal model for routing your calls, please send a YES message to number 11111". I.e. VPLMN1 may be configured to consult the user on whether or not s/he wishes the local breakout to be carried out.

Figure 3:
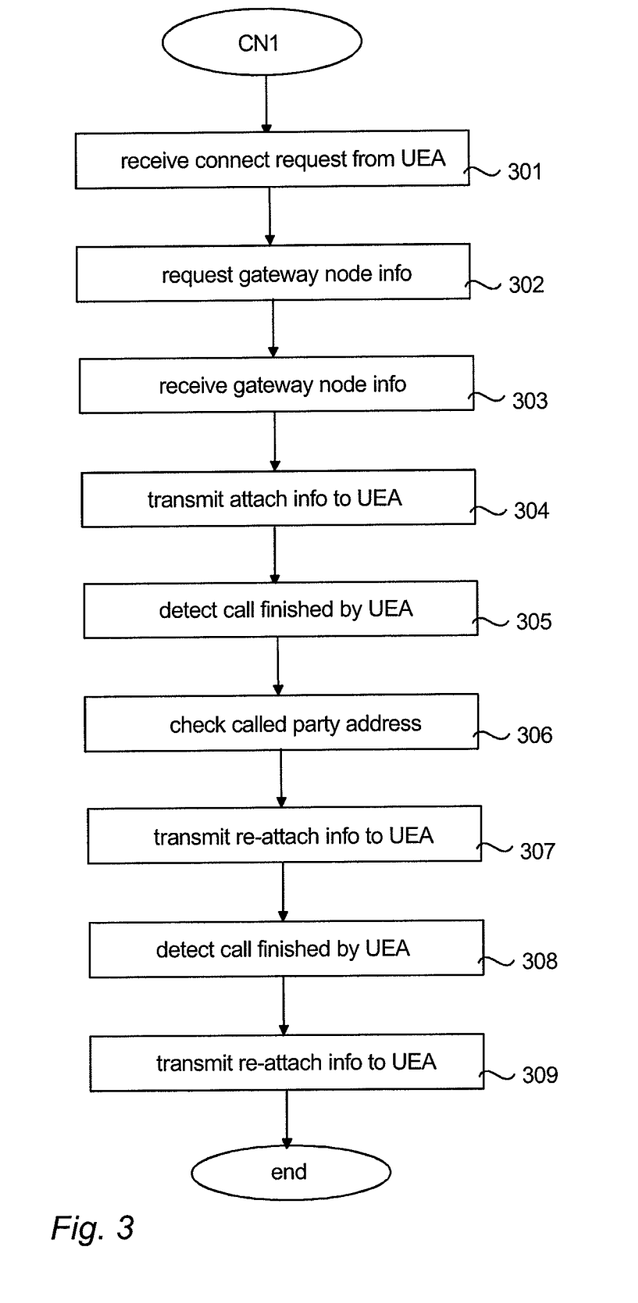
FIG. 3 is a flow chart illustrating the operation of a network apparatus according to an exemplary embodiment.

FIG. 3 is a flow chart illustrating the operation of a network apparatus according to an exemplary embodiment of the present solution. Pekka is roaming in Australia, and he switches on his fancy LTE terminal UEA. Referring to FIG. 3, in response the terminal to being switched on, a connect request message is received in step 301 in the network apparatus which may be e.g. a visited core network node CN1. In response to that, a VPLMN DNS system finds out 302, 303 information on the correct corresponding SGW/PGW (CN1 requests 302 the SGW/PGW information from DNS1 based on FQD; a response is received 303 from DNS1 (thus CN1 is able to check whether UEA is roaming and whether home routing function is in use for UEA)). Based on an agreement between HPLMN2 and VPLMN2, the corresponding PGW node is either located in the home network of UEA (=home routing used) or in the visited network (=local breakout used). CN1 responds 304 to UEA with the assumed IP address of PGW, in this scenario pointing towards the HPLMN PGW (i.e. GW2). In the exemplary embodiment, based on the network implementation and/or end-user preference, CN1 can be automatically configured to perform an override of the home routing function by performing a local PS breakout (i.e. routing the call from UEA to GW1), even though the agreement with HPLMN2 originally states the use of HPLMN PGW (i.e. GW2). In practise, this may be handled as follows:

a) In the initial LTE network attach message, CN1 is configured to respond 304 with the VPLMN PGW IP address (i.e. the address of GW1) instead of HPLMN PGW IP address (i.e. the address of GW2). This is a simple mechanism, but it means that all the traffic, also including non-voice, is then routed by using local breakout.

b) The LTE terminal is initially attached 304 "in an official way" to HPLMN PGW IP address (i.e. HPLMN PGW IP address (i.e. the address of GW2) is given 304 by CN1 to UEA), but when a voice call initialized by UEA is detected 305 by CN1, CN1 is configured to order 307 the terminal to perform a re-attach. When this is carried out, VPLMN PGW IP address (i.e. the address of GW1) is given 307 to the terminal instead. When the call from UEA via GW1 to UEB is detected 308 to be over (e.g. a call finishing message is received 308 in CN1 from UEA), CN1 orders 309 the terminal to perform another reattach, and this time HPLMN PGW IP address (i.e. the address of GW2) is given 309 to UEA. Thus the system can be configured to use local breakout for voice calls (and SMS) only (thus allowing home routing to be used for the more advanced services such as email, MMS, WAP browsing). The re-attach procedure may require some extra time compared to point "a)".

As an advanced option (meaning better end-result but possibly a longer call setup time), the VPLMN "dynamic local breakout function" may also be configured to perform a query 306 (i.e. CN1 transmits 306 a query message to DB1, and a response transmitted by DB1 is received 306 in CN1) on the MSISDN/address of the called party UEB to see if the particular voice call (or SMS) is addressed to:

1) a user of VPLMN1 or any other local operator (=>local breakout);

2) a user of HPLMN2 (=>no local breakout);

3) a user of some other operator (=>no clear answer). Point "3)" may depend on available agreements and/or commercial benefits, etc. It is possible to have this particular logic input as an implementation/configuration issue that may be modified by the user, HPLMN2 or even VPLMN1, based on their preferences. For example, CN1 may be configured to have its own preference here.

Assuming Pekka wants to check the status of tickets for the Sydney opera house, a voice call initialized by Pekka/UEA is detected in CN1 in step 305. Based on the PGW discovery handled earlier (steps 302, 303), and possibly based on the use of receiving MSISDN/address (step 306) too, CN1 knows that it should perform a local breakout override, since in this network home routing is used for PS domain (i.e. CN1 forces UEA to set up the call service via the local network such that the home network routing function is overridden).

One option is that via some mechanism (such as push SMS) CN1 asks the user e.g. "in case you would like to set up an optimal model for routing your calls, please send a YES message to number 11111". I.e. CN1 may be configured to consult the user on whether or not s/he wishes the local breakout to be carried out.

Figure 4:
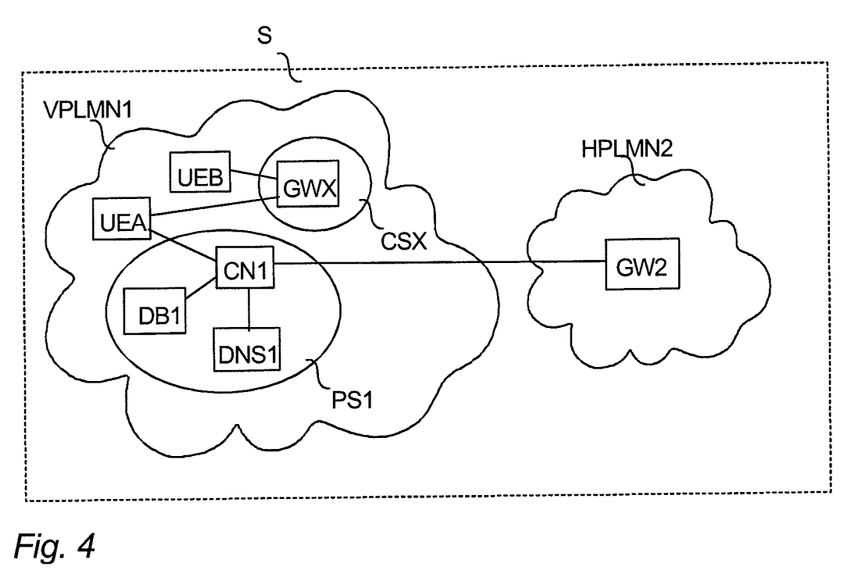
FIG. 4 illustrates a communications system according to an exemplary embodiment.

A general architecture of a communication system S providing a dynamic CS fallback functionality to a user terminal in a roaming network is illustrated in FIG. 4. FIG. 4 is a simplified system architecture only showing some elements and functional entities, all being logical units whose implementation may differ from what is shown. The connections shown in FIG. 4 are logical connections; the actual physical connections may be different. It is apparent to a person skilled in the art that the systems also comprise other functions and structures. It should be appreciated that the functions, structures, elements and the protocols used in or for local breakout, are irrelevant to the actual invention. Therefore, they need not to be discussed in more detail here.

Referring to FIG. 4, a communications system S according to an exemplary embodiment of the present solution comprises a visited public land mobile network VPLMN1, such as an LTE network. The communications system S further includes a home public land mobile network HPLMN2, such as an LTE network. The visited public land mobile network VPLMN1 includes a core network node CN1, such as a mobility management entity (MME), a serving gateway (SGW) or any other suitable core network element. The core network node CN1, located in a local packet switched network PS1, is operatively connected to a domain name server DNS1, located in PS1. Further, the core network node CN1 may be operatively connected to a database DB1, located e.g. in PS1. Yet further, the core network node CN1 may be operatively connected to a gateway node GW2, such as a packet data network (PDN) gateway, located in HPLMN2. The system S further comprises a user equipment UEA, UEB that may be e.g. a mobile or wireless user terminal, such as a mobile phone (mobile station), a personal digital assistant (PDA), a game console, a smart phone, a personal computer (PC), a laptop, a desktop computer or the like, capable of communicating in a roaming situation. The first user terminal UEA is able to connect to the second user terminal UEB via a gateway node GWX, such as a circuit switched (CS) network gateway, located in a local circuit switched network CSX. The first user terminal UEA is able to connect to a gateway node GW2, such as a packet data network (PDN) gateway, located in HPLMN2, via the core network node CN1. In the example shown in FIG. 4, the first user terminal UEA is roaming in the visited public land mobile network VPLMN1, and the home public land mobile network HPLMN2 is the home network of the first user terminal UEA.

FIG. 4 shows a simplified version of an LTE network structure, which only illustrates the components that are essential to illustrate the present solution, even though those skilled in the art naturally know that a general communications system also comprises other functions and structures, which do not have to be described in more detail herein. The network element CN1, DNS1, DB1, GW2, GWX may include any network element operated by a network operator in a cellular, wireless and/or fixed network, such as a mobile switching centre, SGSN, GGSN, VLR, HLR, HSS, base station, access point, radio network controller, database, and/or a network computer or server. Although each network element UEA, UEB, CN1, DNS1, DB1, GW2, GWX has been depicted as one entity, different modules and memory may be implemented in one or more physical or logical entities. A general architecture of a communication system providing session-based communication is illustrated in FIG. 4. It is apparent to a person skilled in the art that the systems also comprise other functions and structures. It should be appreciated that the functions, structures, elements and the protocols used in or for session-based communication are irrelevant to the actual invention. Therefore, they need not be discussed in more detail here.

Figure 5:
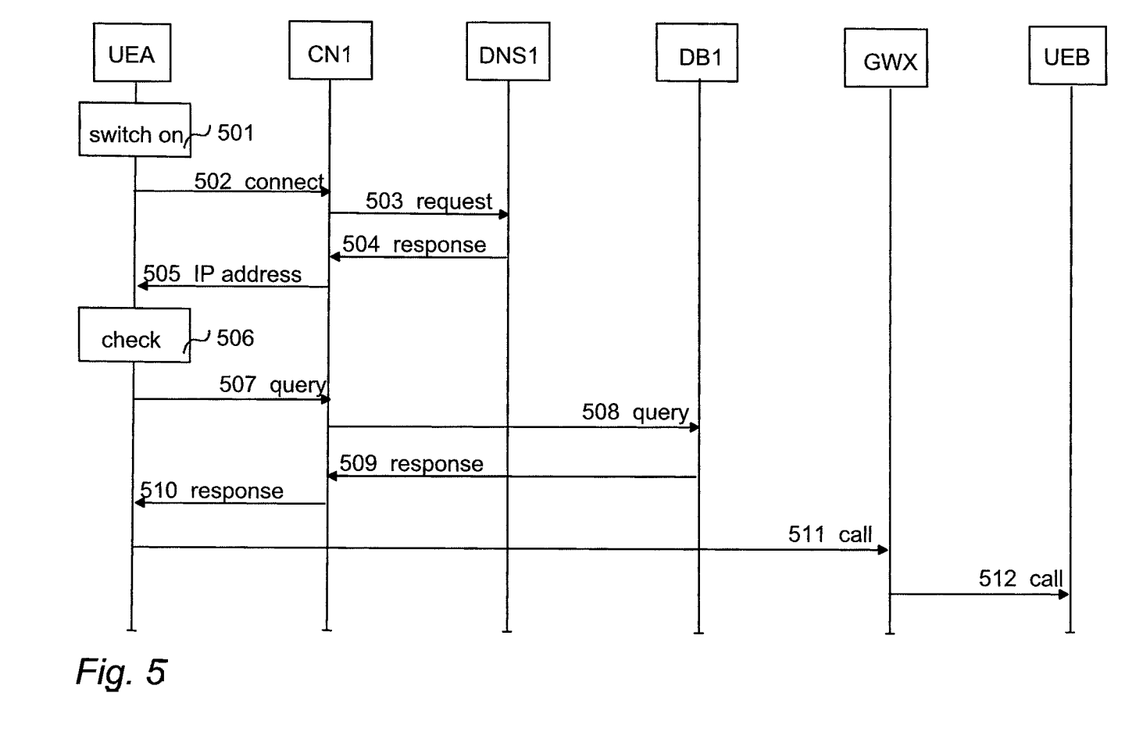
FIG. 5 illustrates signalling according to an exemplary embodiment.

Referring to FIG. 5, Pekka is in Australia, and he switches 501 on his fancy LTE terminal, i.e. a first user terminal UEA. In response to being switched on, the first user terminal UEA connects 502 to an LTE network using normal standardized SGW & PGW discovery mechanisms (a respective message 502 is transmitted from UEA to CN1). The VPLMN DNS system finds out 503, 504 the correct corresponding SGW & PGW nodes based on Pekka's terminal request which includes FQDN of Pekka's operator (CN1 requests 503 the SGW/PGW information from DNS1 based on FQDN; DNS1 transmits a response 504 to CN1). Based on the agreement between HPLMN2 and VPLMN1, the PGW node is either located in HPLMN2 (=home routing used) or VPLMN1 (=local breakout used). VPLMN1 (i.e. CN1) responds 505 to UEA with the correct IP address of PGW, in this scenario pointing towards the HPLMN PGW. The terminal UEA checks 506 the received PGW IP address against the known home PGW IP address. If the addresses match, the terminal knows that home routing is used (i.e. UEA is able to check whether UEA is roaming and whether home routing function is in use for UEA). Based on client implementation and/or end-user preference, the client in UEA may automatically perform a CS fallback action or consult the user of UEA on whether s/he would like CS fallback to be carried out. As an advanced option (meaning better end-result but possibly a longer call setup time), the client may also perform a query 507 (i.e. UEA transmits a query message 507 to CN1, wherein CN1 transmits a query message 508 to DB1, and a response 509 is transmitted from DB1 to CN1, wherein CN1 transmits a response 510 to UEA) on the recipient MSISDN/address to see if the call is addressed to 1) a user of VPLMN1 or any other local operators (=>CS fallback);

2) a user of HPLMN2 (=>no CS fallback);

3) a user of some other operator (=>no clear answer). This depends heavily on the available agreements, etc., but the default option may be driven by general needs of HPLMN2: e.g. no CS fallback is carried out if the HPLMN operator wishes to move a maximum amount of traffic into PS based networks due to lower costs.

Assuming Pekka wants to check the status of tickets for the Sydney opera house, he dials the local number in his fancy LTE terminal. Based on the PGW discovery handled earlier (messages 502, 503, 504, 505) and possibly based on the preference list handled (messages 507, 508, 509, 510), the terminal UEA knows that it should perform the CS fallback since in this network the home routing functionality is used for the PS domain. CS fallback is carried out (i.e. UEA is forced to set up the call service via the local circuit switched network CSX such that the home network routing function is overridden), and the call 511, 512 from UEA to the opera house (i.e. to the called party UEB) uses the CS network and local breakout allowing Pekka to have a good quality discussion on the discount tickets via GWX.

Figure 6:
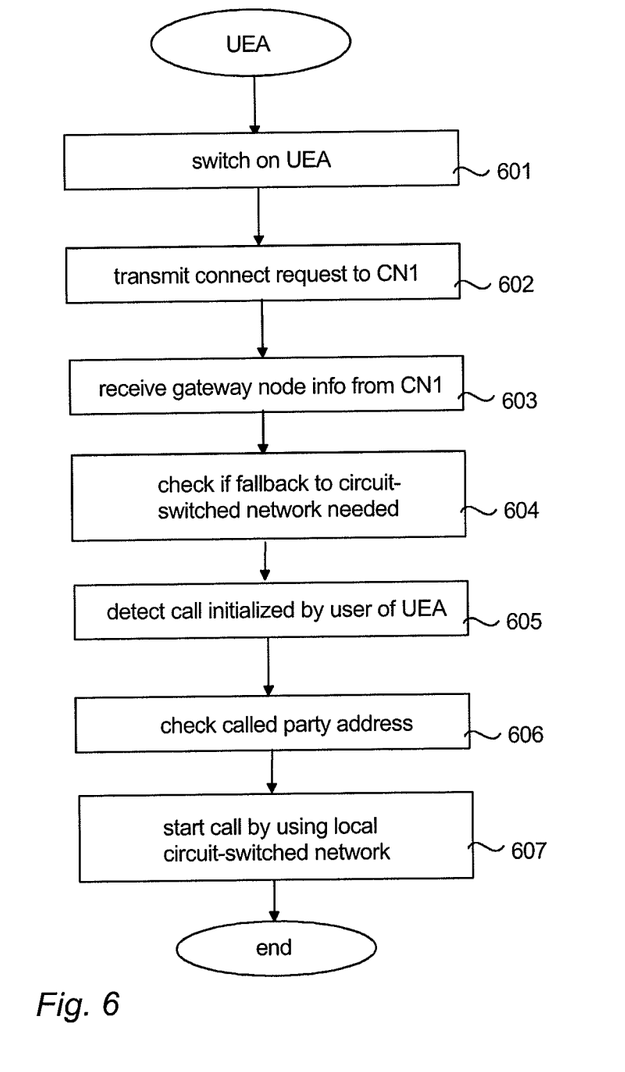
FIG. 6 is a flow chart illustrating the operation of a user terminal according to an exemplary embodiment.

FIG. 6 is a flow chart illustrating the operation of a user terminal UEA according to an exemplary embodiment of the present solution. Pekka is roaming in Australia, and he switches on his fancy LTE terminal UEA. Referring to FIG. 6, in response to the terminal to being switched on in step 601, a connect request message is transmitted in step 602 to a network apparatus which may be e.g. a visited core network node CN1. In step 603, UEA receives a response transmitted by CN1, including the correct IP address of PGW, in this scenario pointing towards the HPLMN PGW. The terminal UEA checks 604 the received PGW IP address against the known home PGW IP address. If the addresses match, the terminal knows that home routing is used (i.e. UEA is able to check whether UEA is roaming and whether home routing function is in use for UEA). Based on client implementation and/or end-user preference, the client in UEA may automatically perform a CS fallback action or consult the user of UEA on whether s/he would like the CS fallback to be carried out. As an advanced option (meaning better end-result but possibly a longer call setup time), the client may also perform a query (i.e. UEA transmits 606 a query message to CN1, and UEA receives 606 a response from CN1) on the recipient MSISDN/address to see if the call is addressed to 1) a user of VPLMN1 or any other local operators (=>CS fallback);
2) a user of HPLMN2 (=>no CS fallback);
3) a user of some other operator (=>no clear answer). This depends heavily on the available agreements, etc., but the default option may be driven by general needs of HPLMN2: e.g. no CS fallback is carried out if the HPLMN operator wishes to move a maximum amount of traffic into PS based networks due to lower costs.

Assuming Pekka wants to check the status of tickets for the Sydney opera house, a voice call initialized by Pekka is detected in UEA in step 605. Based on the PGW discovery handled earlier (steps 602, 603, 604) and possibly based on the preference list handled (step 606), the terminal UEA knows that it should perform the CS fallback since in this network the home routing functionality is used for the PS domain. CS fallback is carried out (i.e. UEA is forced to set up the call service via the local circuit switched network CSX such that the home network routing function is overridden), and the call made 607 by UEA to the opera house (i.e. to the called party UEB) uses the CS network and local breakout allowing Pekka to have a good quality discussion on the discount tickets via GWX.

The present mechanisms may also be applicable for 3G roaming, in case operators wish to start deploying IP-based voice and local breakout model in 3G too. So the client may be arranged check, in the above way, whether the local breakout is available when the PS domain is used to make voice calls. If the local breakout is not available then according to the above mechanisms the client may be arranged "drop" the call into the CS domain. Obviously, if a 3G call is run in the normal CS domain, there is no need to perform the checking.

In a possible ultimate long term evolution environment where everybody is using the local breakout, the need for the present solution may vanish. However, it is possible that this is never going to take place globally, due to different operators having different commercial and technical ideas and policies, or at least it will take a very long time.

It should be noted that an average user does not have a clue on what kind of roaming architecture there happens to be in that particular network nor necessarily even which operator the receiving end is using, i.e. manual selection (made by the user of UEA) to optimize this scenario in the same way as illustrated by in an embodiment of the present solution is theoretically possible but less likely compared to an automatic selection (made by UEA and/or CN1).

Regarding the above dynamic local PS breakout functionality, a benefit from not performing the CS fallback (but performing the dynamic local PS breakout instead) may include that the voice call may be kept within the PS domain and the LTE network where the expenses are smaller, i.e. it is beneficial for the operator to use VoLTE as much as possible.

Having the local PS breakout functionality offered via an "official way" might be desired, but in case that cannot be arranged by political agreements/still ongoing commercial negotiations etc., the present solution allows a roaming customer to make a voice call successfully, which is highly beneficial for both VPLMN and especially for HPLMN.

In addition to helping the official operator's voice service, it is possible to include the above dynamic local PS breakout functionality and the above dynamic CS fallback functionality based on the used PS roaming model also for non-operator voice services such as Skype or Google Talk (or any other call service).

It is possible to set a terminal (depending on the implementation) to set a preference of PS voice over CS voice (or vice versa), but currently there is no way to make this functionality dynamic based on VPLMN/HPLMN agreements/arrangements over the used architecture in that particular network the user happens to be roaming or based on the receiving user's serving operator. Therefore, the present solution provides a dynamic mechanism for local PS breakout and/or CS fallback in LTE roaming.

The present solution allows optimal routing for various kinds of traffic.

An embodiment of the present solution involves utilizing CS fallback dynamically based on the roaming architecture ("dynamic CS fallback in LTE roaming"). The present solution defines a mechanism where a roaming terminal, based on information available in VPLMN, is able to dynamically decide to use fallback to CS roaming when voice service is used, even though the LTE access network and VoLTE service is available.

Alternatively, some kind of advanced masking/faking methods may be used by VPLMN to override terminal/HPLMN decisions, i.e. utilize local breakout based on the VPLMN decision even if this was not really asked for. I.e. instead of the terminal making decisions, the network makes it.

One solution may be to continue using just the 2/3G network instead of LTE whenever roaming, just to be safe. A slightly more advanced solution is to use the manual network selection from LTE to 2/3G prior to making the voice call.

The present solution allows optimal routing for different kinds of traffic. Allowing local breakout for PS roaming may require changes in the commercial roaming architecture. The use of the dynamic CS fallback mechanism may require that VPLMN has a CS domain to fall into or that another local CS network is available. By using CS fallback it is possible to use the local breakout mechanisms available for VPLMN; this requires though the existence of such CS network, which is not necessarily the case e.g. when VPLMN is operated by a greenfield LTE operator only. An alternative is to utilize handover to another radio access network instead of LTE. For example, in case the LTE terminal is also equipped with WLAN, it is possible to use WLAN instead of LTE in case the particular VPLMN does not have local breakout with LTE. An advantage of this is that with WLAN there is always a local breakout available. WLAN also supports the same native VoLTE voice solution as the LTE bearer.

In essence during the PGW discovery process, VPLMN decides to act "on behalf of roaming customer" by enabling a local breakout even though the basic agreement between HPLMN and VPLMN is based on home routing usage. Signalling traffic would still be routed to HPLMN in any case, even though media would flow via more optimal route when the local breakout is used.

In the present solution, it may be checked 303, 606 whether the call service is addressed to a second user terminal UEB, the home network HPLMN2 of a first user terminal being the home network of the second user terminal. If the call service is addressed to the second user terminal, and the home network of the first user terminal is the home network of the second user terminal, the overriding of the home network routing function may be prevented in the system.

The steps/points, signalling messages and related functions described above in FIGS. 1 to 6 are in no absolute chronological order, and some of the steps/points may be performed simultaneously or in an order differing from the given one. Other functions can also be executed between the steps/points or within the steps/points and other signalling messages sent between the illustrated messages. Some of the steps/points or part of the steps/points can also be left out or replaced by a corresponding step/point or part of the step/point. The apparatus operations illustrate a procedure that may be implemented in one or more physical or logical entities. The signalling messages are only exemplary and may even comprise several separate messages for transmitting the same information. In addition, the messages may also contain other information.

In addition to prior-art means, a system or system network nodes that implement the functionality of the present solution comprise means for performing the overriding of the home network routing function in the manner described above. Existing network nodes and user terminals comprise processors and memory that may be utilized in the operations of the present solution. Any changes necessary in implementing the present solution may be carried out using supplements or updates of software routines and/or routines included in application-specific integrated circuits (ASIC) and/or programmable circuits, such as EPLDs (electrically programmable logic device) or FPGAs (field programmable gate array).

It will be obvious to a person skilled in the art that, as the technology advances, the inventive concept may be implemented in various ways. The invention and its embodiments are not limited to the examples described above but may vary within the scope of the claims.

LIST OF ABBREVIATIONS

LTE—long term evolution
4G—fourth generation
CS—circuit switched
PS—packet switched
VPLMN—visited public land mobile network
HPLMN—home public land mobile network
VoLTE—voice over LTE
SGW—serving gateway
PGW—PDN gateway
PDN—packet data network
MMS—multimedia messaging service
WAP—wireless application protocol
IP—internet protocol
2G—second generation
3G—third generation
GSM—global system for mobile communications
SMS—short message service
CN—core network
UE—user equipment
DB—database
DNS—domain name server
3GPP—$3^{rd}$ generation partnership project
WLAN—wireless local area network

The invention claimed is:

1. A method for providing a call service in a communication system, wherein, in response to recognizing a predetermined event related to a first user terminal, the method comprises
checking whether the first user terminal is a roaming user terminal roaming in a visited packet switched network; and
checking whether the first user terminal is defined to use a home network routing function in the visited packet switched network;
wherein if the first user terminal is a roaming user terminal roaming in the visited packet switched network and defined to use the home network routing function in the visited packet switched network, the method further comprises, in connection with a set-up of the call service by the first user terminal,
forcing the first user terminal to set up the call service via a local circuit switched network and utilizing circuit switched fallback such that the home network routing function is overridden, the method comprising overriding the home network routing function for the call service only if the call service comprises a circuit switched call set-up,
wherein the overriding step is performed in connection with a network re-attach procedure of the first user terminal to a local packet switched network, the re-attach procedure being forced by a visited core network node, wherein the IP address of a local gateway node is provided to the first user terminal for routing the traffic between the first user terminal and a called party via the local gateway node.

2. A method as claimed in claim 1, wherein the method comprises
checking whether the call service is addressed to a second user terminal, the visited network or other local network being the home network of the second user terminal,
wherein if the call service is addressed to the second user terminal, the visited network or other local network being the home network of the second user terminal, the method comprises overriding the home network routing function.

3. A method as claimed in claim 1, wherein the method comprises
checking whether the call service is addressed to a second user terminal, the home network of the first user terminal being the home network of the second user terminal,
wherein if the call service is addressed to the second user terminal, the home network of the first user terminal being the home network of the second user terminal, the method comprises
preventing the overriding of the home network routing function.

4. A method according to claim 1, wherein the call service comprises one or more of a voice call service, a short message service, and a facsimile service.

5. A method as claimed in claim 1, wherein the forcing step is performed in connection with a dial-up procedure in the first user terminal, wherein the traffic between the first user terminal and a called party is routed via a local circuit switched network.

6. A method as claimed in claim 1, wherein the checking steps are performed in the first user terminal.

7. A method as claimed in claim 1, wherein
in response the first user terminal finishing using the call service, the method comprises providing the IP address of a home network node to the first user terminal for routing the traffic between the first user terminal and the called party via the home network node.

8. A method as claimed in claim 1, wherein the checking steps are performed in a visited core network node.

9. A method as claimed in claim 1, wherein it comprises performing a dynamic local breakout in the visited network.

10. A communication system, wherein, in response to recognizing a predetermined event related to a first user terminal, the system is configured to
check whether the first user terminal is a roaming user terminal roaming in a visited packet switched network; and
check whether the first user terminal is defined to use a home network routing function in the visited packet switched network;
wherein if the first user terminal is a roaming user terminal roaming in the visited packet switched network and defined to use the home network routing function in the visited packet switched network, the system is further configured to, in connection with a setup of the call service by the first user terminal,
force the first user terminal to set up the call service via a local circuit switched network and utilize circuit switched fallback such that the home network routing function is overridden, wherein the system is configured to override the home network routing function for the call service only if the call service comprises a circuit switched call set-up,
wherein the system is configured to perform the forcing step in connection with a network re-attach procedure of the first user terminal to a local packet switched network, the re-attach procedure being forced by a visited core network node, wherein the system is configured to provide the IP address of a local gateway node to the first user terminal for routing the traffic between the first user terminal and a called party via the local gateway node.

11. A system as claimed in claim 10, wherein the system is configured to
check whether the call service is addressed to a second user terminal, the visited network or other local network being the home network of the second user terminal,
wherein, if the call service is addressed to the second user terminal, the visited network or other local network being the home network of the second user terminal, the system is configured to
override the home network routing function.

12. A system as claimed in claim 10, wherein the system is configured to
check whether the call service is addressed to a second user terminal, the home network of the first user terminal being the home network of the second user terminal,
wherein, if the call service is addressed to the second user terminal, the home network of the first user terminal being the home network of the second user terminal, the system is configured to
prevent the overriding of the home network routing function.

13. A system as claimed in claim 10, wherein the system is configured to perform the forcing step in connection with a dial-up procedure in the first user terminal, wherein the system is configured to provide the IP address of a local gateway node to the first user terminal for routing the traffic between the first user terminal and a called party via the local gateway node.

14. A system as claimed in claim 10, wherein the system is configured to perform the checking steps in the first user terminal.

15. A system as claimed in claim 10, wherein
in response the first user terminal finishing using the call service, the system is configured to provide the IP address of a home network node to the first user terminal for routing the traffic between the first user terminal and the called party via the home network node.

16. A system as claimed in claim 10, wherein the system is configured to perform the checking steps in the visited core network node.

17. A network apparatus for a communication system, wherein, in response to recognizing a predetermined event related to a first user terminal, the apparatus is configured to
check whether the first user terminal is a roaming user terminal roaming in a visited packet switched network; and
cheek whether the first user terminal is defined to use a home network routing function in the visited packet switched network;
wherein, if the first user terminal is a roaming user terminal roaming in the visited packet switched network and defined to use the home network routing function in the visited packet itched network, the apparatus is further configured to, in connection with a set-up of the call service by the first user terminal, force the first user terminal to set up the call service via a local circuit switched network and utilize circuit switched fallback such that the home network routing function is overridden, wherein the apparatus is configured to override the home network routing function for the call service only if the call service comprises a circuit switched call set-up,
wherein the apparatus is configured to perform the overriding step in connection with a network re-attach procedure of the first user terminal to the visited packet switched network, the re-attach procedure being forced by the apparatus, wherein apparatus is configured to provide the IP address of a visited gateway node to the first user terminal for routing the traffic between the first user terminal and a called party via the visited gateway node.

18. An apparatus as claimed in claim 17, wherein the apparatus is configured to
check whether the call service is addressed to a second user terminal, the visited network or other local network being the home network of the second user terminal,
wherein, if the call service is addressed to the second user terminal, the visited network or other local network being the home network of the second user terminal, the apparatus is configured to
override the home network routing function.

19. An apparatus as claimed in claim 17, wherein the apparatus is configured to
check whether the call service is addressed to a second user terminal, the home network of the first user terminal being the home network of the second user terminal,
wherein, if the call service is addressed to the second user terminal, the home network of the first user terminal being the home network of the second user terminal, the apparatus is configured to
prevent the overriding of the home network routing function.

20. An apparatus as claimed in claim 17, wherein
in response to the first user terminal finishing using the call service, the apparatus is configured to provide the IP address of a home network node to the user terminal for routing the traffic between the first user terminal and the called party via a home network node.

21. An apparatus as claimed in claim 17, wherein the apparatus comprises a visited core network node of the visited packet switched network.

22. A first user terminal for a communication system, wherein, in response to recognizing a predetermined event related to the first user terminal, the first user terminal is configured to
check whether the first user terminal is a roaming user terminal roaming in a visited packet switched network; and
check whether the first terminal is defined to use a home network routing function in the visited packet switched network;
wherein, if the first user terminal is a roaming user terminal roaming in the visited packet switched network and defined to use the home network routing function in the visited packet switched network, the first user terminal is further configured to, in connection with a set-up of the call service by the first user terminal, force the first user terminal to set up the call service via a local circuit switched network and utilize circuit switched fallback such that the home network routing function is overridden, wherein the first user terminal is configured to override the home network routing function for the call service only if the call service comprises a circuit switched call set-up,
the first user terminal is configured to perform the overriding step in connection with a network re-attach procedure of the first user terminal to the visited packet switched network, wherein the first user terminal is configured to receive, from a visited core network node, the IP address of a visited gateway node for routing the traffic between the first user terminal and a called party via the visited gateway node.

23. A first user terminal as claimed in claim 22, wherein the first user terminal is configured to
check whether the call service is addressed to a second user terminal, the visited network or other local network being the home network of the second user terminal,
wherein, if the call service is addressed to the second user terminal, the visited network or other local network being the home network of the second user terminal, the first user terminal is configured to
override the home network routing function.

24. A first user terminal as claimed in claim 22, wherein the first user terminal is configured to
check whether the call service is addressed to a second user terminal, the home network of the first user terminal being the home network of the second user terminal,
wherein, if the call service is addressed to the second user terminal, the home network of the first user terminal being the home network of the second user terminal, the first user terminal is configured to
prevent the overriding of the home network routing function.

* * * * *

UNITED STATES PATENT AND TRADEMARK OFFICE
CERTIFICATE OF CORRECTION

PATENT NO. : 9,301,079 B2
APPLICATION NO. : 13/276626
DATED : March 29, 2016
INVENTOR(S) : Tero Jalkanen

Page 1 of 1

It is certified that error appears in the above-identified patent and that said Letters Patent is hereby corrected as shown below:

Claims

Column 14, line 28, Claim 17, the word "itched" should read --switched--.

Signed and Sealed this
Seventh Day of June, 2016

Michelle K. Lee
*Director of the United States Patent and Trademark Office*